United States Patent [19]
Kubota

[11] Patent Number: 5,709,358
[45] Date of Patent: Jan. 20, 1998

[54] INSTALLING STRUCTURE OF CLUSTER MODULE

[75] Inventor: Minoru Kubota, Shizuoka-ken, Japan

[73] Assignee: Yazaki Corporation, Tokyo, Japan

[21] Appl. No.: 738,783

[22] Filed: Oct. 29, 1996

[30] Foreign Application Priority Data

Oct. 30, 1995 [JP] Japan ................... 7-281905

[51] Int. Cl.⁶ .................... H02B 1/10; B60K 35/00
[52] U.S. Cl. .................... 248/27.1; 248/27.3; 361/647; 439/34; 296/70
[58] Field of Search ................... 248/27.1, 27.3; 439/34; 296/70, 72; 180/90; 361/647

[56] References Cited

U.S. PATENT DOCUMENTS

| | | | |
|---|---|---|---|
| 4,812,133 | 3/1989 | Fleak et al. | 248/27.3 X |
| 4,942,499 | 7/1990 | Shibata et al. | 439/34 X |
| 5,324,203 | 6/1994 | Sano et al. | 296/70 X |
| 5,353,190 | 10/1994 | Nakayama et al. | 439/34 X |
| 5,403,193 | 4/1995 | Ito et al. | 439/34 |
| 5,430,612 | 7/1995 | Simon et al. | 248/27.1 X |
| 5,478,032 | 12/1995 | Miller | 248/27.1 |
| 5,487,680 | 1/1996 | Yamanashi | 439/34 X |
| 5,502,615 | 3/1996 | Kubota et al. | 439/34 X |
| 5,589,715 | 12/1996 | Nishitani et al. | 439/34 X |
| 5,627,409 | 5/1997 | Nishitani | 439/34 X |

FOREIGN PATENT DOCUMENTS 7-96774  4/1975  Japan.

*Primary Examiner*—Peter M. Cuomo
*Assistant Examiner*—Robert J. Sandy
*Attorney, Agent, or Firm*—Finnegan, Henderson, Farabow, Garrett & Dunner, L.L.P.

[57] ABSTRACT

A cluster module, which is arranged so that electric parts are put together, is installed to a concave section formed on a front surface of an instrument panel, and a W/H connector and a display unit, which is projected ahead than the W/H connector are installed to a front wall surface of the concave section. Moreover, a connector fitting section fitted to the W/H connector and a display unit fitting section fitted to the display unit are provided to the back surface of the cluster module. Therefore, the display unit fitting section is led by the display unit so that the cluster module can be installed to a desired position of the concave section of the instrument panel easily.

4 Claims, 3 Drawing Sheets

INSTALLING STRUCTURE OF CLUSTER MODULE

BACKGROUND OF THE INVENTION

The present invention relates to an installing structure for installing a cluster module to an instrument panel of a car.

In order to improve operability of installing various electric parts to an instrument panel of a car, a structure that a cluster module, which is arranged so that electric parts are put together, is installed to an instrument panel is suggested (Japanese Patent Laid-Open No.7-96774). Such a cluster module is fitted into a concave section formed on a front surface of the instrument panel from a front side of the instrument panel so as to be installed to a car body.

In this structure, a connector for connecting a wire harness (hereinafter, referred to as W/H connector) is previously fitted to the front wall surface which is in an inner part of the concave section of the instrument panel. The cluster module is fitted into the concave section of the instrument panel so as to be electrically connected to the W/H connector.

The above-mentioned conventional technique makes the cluster module simple electrically and systematically, and the cluster module can be installed to the instrument panel and is also connected to the W/H connector. This technique has the above advantage but also has the following disadvantage.

Namely, since the cluster module is large as a structure, its locating at the time of installing to the instrument panel is difficult, particularly, fitting to the W/H connector which is in the innermost part of the instrument panel is difficult. As countermeasures against this problem, means for providing a guide pin or the like to the instrument panel or the cluster module is considered, but this cannot avoid the enlargement and an increase in weight of the components.

SUMMARY OF THE INVENTION

The present invention is invented from a viewpoint of the aforementioned problem, and it is an object of the present invention to improve an ability to install a cluster module to an instrument panel and to provide an installing structure of a cluster module which makes fitting of the cluster mode to a W/H connector easy and secure.

In order to achieve the above object, the present invention in an installing structure for installing a cluster module arranged so that electric parts are put together in a concave section formed on a front surface of an instrument panel, is characterized by having a wire harness connector installed to a front wall surface of the concave section; a display unit installed to the front wall surface of the concave section so as to be projected ahead than the wire harness connector; a connector fitting section fitting to the wire harness connector, the connector fitting section being provided to a back surface of the cluster module; and a display unit fitting section fitted to the display unit, the display unit fitting section being provided to the back surface of the cluster module.

In accordance with the above structure, at the time of installing the cluster module, the display unit fitting section is led by the display unit so as to be located, and the connector fitting section is fitted to the W/H connector accurately so that the installation of the cluster module is completed. Therefore, the complicated locating process at the time of installing the cluster module is not required, and the cluster module can be installed automatically, thereby improving the ability to install the cluster module.

Moreover, since the display unit is provided separately from a meter, If the arrangement of the display unit is united, the display unit can be used commonly for a digital meter and an analog meter. As a result, the arrangement of the cluster module and a circuit configuration of a flexible wiring substrate can be simplified. Moreover, even if the cluster module is substituted, it is not necessary to reset the display, and it is not necessary to correct a counter.

In addition, the taper opening end which is enlarged in an outer circumferential direction is formed on the display unit fitting section.

In accordance with such a structure, even if the cluster module is slightly displaced, the display unit is brought into contact with the taper opening end, and thus the cluster module is led accurately.

In addition, the display unit is composed of a connector connected to the instrument panel wire harness and a display provided to the connector, and at the same time the display unit fitting section can be formed in the meter of the cluster module.

In accordance with the above structure, the display unit can be installed in the meter of the cluster module at the same time of installing the cluster module. As a result, contents of the display can be displayed on a display plate of the meter without another electric wiring, etc. Therefore, the installing operation can be improved.

In addition, the display of the display unit can be provided so as to be attached to and detached from the connector.

In accordance with the above structure, the display can be substituted and corrected easily.

For a fuller understanding of the nature and advantages of the invention, reference should be made to the ensuing detailed description taken in conjunction with the accompanying drawings.

DESCRIPTION OF THE PREFERRED EMBODIMENTS

The following describes embodiment of the present invention on reference to the drawings.

Figure 1:
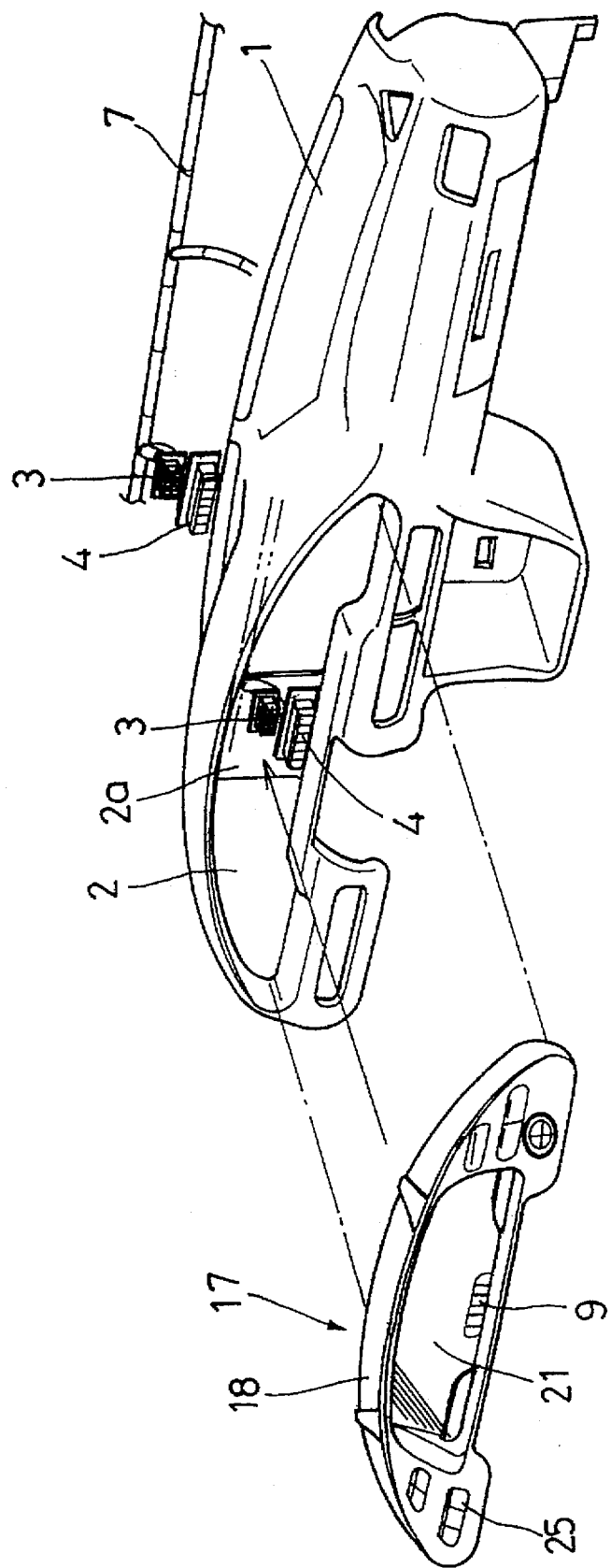
FIG. 1 is an assembly perspective view which shows an installing structure of a cluster module according to embodiment of the present invention.
Figure 2:
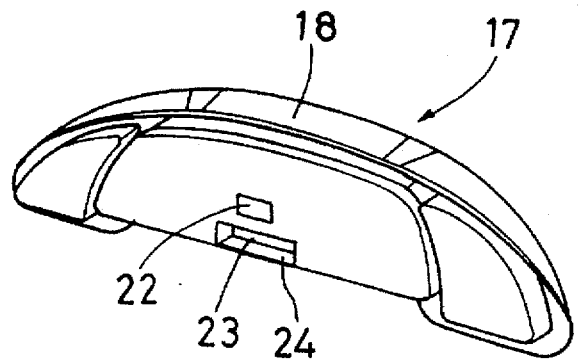
FIG. 2 is a back side view of the cluster module in FIG. 1.
Figure 3:
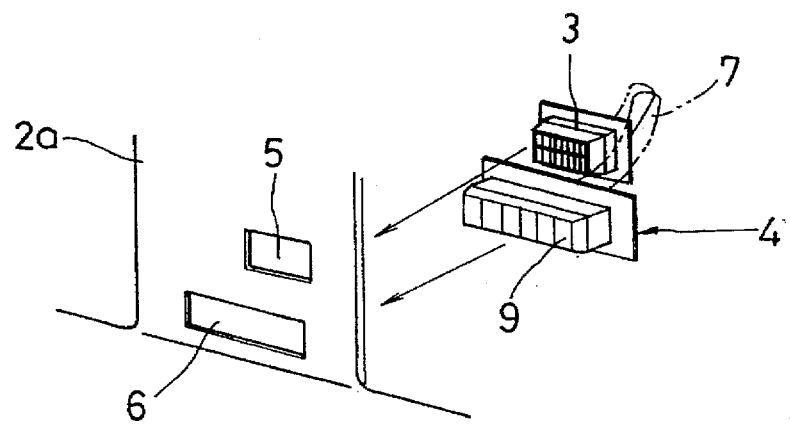
FIG. 3 is a perspective view which shows an installing process of a W/H connector and a display unit in FIG. 1 to an instrument panel.

In FIGS. 1 through 3, a concave section 2 is formed on a front surface of an instrument panel 1, a W/H connector 3 and a moving unit with a built-in display 4 (i.e. display unit) are installed to respectively to mounting holes 5 and 6 on a front wall surface 2a of the concave section 2. The W/H connector 3 and the display unit 4 are connected to an instrument panel wire harness 7.

Figure 4:
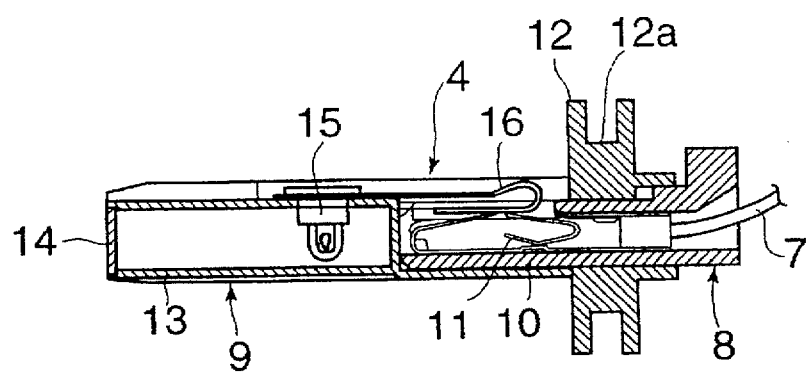
FIG. 4 is a vertical cross sectional view of the display unit.

As shown in FIG. 4, the display unit 4 is composed of a connector 8 and a display 9. The connector 8 has a spring contact 11 for connecting the connector 8 to the instrument panel wire harness 7 in its square tubular main body section 10. Moreover, the display 9 has a display surface 14 on a front surface of a housing 13, and a light source 15 in the housing 13. The light source 15 is connected to a spring contact 16, and a mounting member 12 is provided to an outer circumference on the back of the housing 13. An outer circumference groove 12a of the mounting member 12 is fitted into the mounting hole 6 on the front wall surface 2a so that the display 9 is fixed to the instrument panel 1. The connector 8 is attached to the display 9 from the back of the display 9 so as to be freely attached thereto and removed therefrom, and the connector 8 is electrically connected to the display 9 by the contact between the spring contacts 11 and 16.

As shown in FIGS. 1 and 5, a cluster module 17 has a meter 19 installed to a frame 18 having a shape agreeing with the concave section 2 of the instrument panel 1. A lens 20 is installed to a front surface of the meter 19, and a display plate 21 such as glass is installed to a front surface of the lens 20. A switch unit 25 is provided to both sides of the meter 19 (display section 21).

A connector fitting section 22 which is fitted to the W/H connector 3 and a display unit fitting section 23 which is fitted to the display unit 4 are formed on a rear side of the meter 19. A taper opening end 24 which is enlarged in an outer circumferential direction is formed at an opening end of the display unit fitting section 23.

The following describes an installing process of the cluster module 17 on reference to FIG. 5.

Figure 5A:
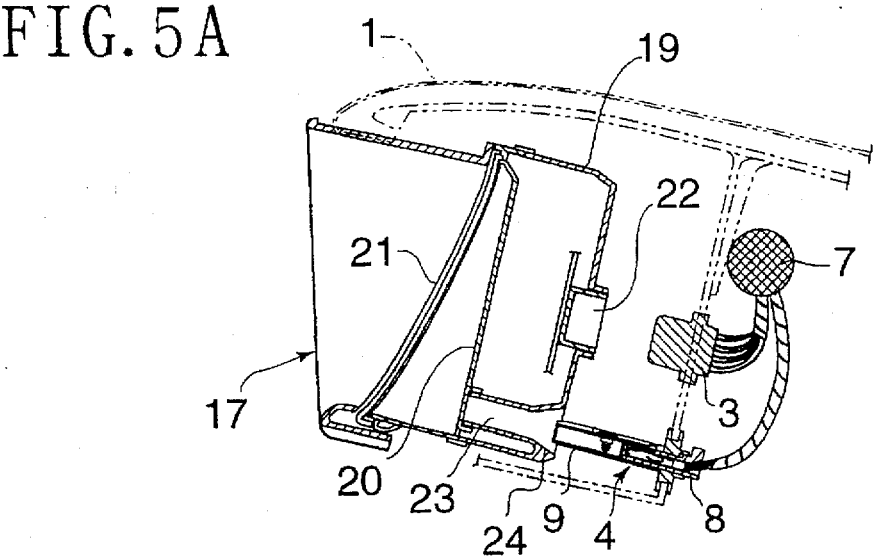
FIG. 5A is a vertical cross sectional view which shows a state just after starting the installing process of the cluster module.

As shown in FIG. 5A, since the display unit 4 is projected from the front wall surface 2a higher than the W/H connector 3, it is projected ahead of the concave section 2. In the initial state that the cluster module 17 is fitted into the concave section 2 of the instrument panel, as shown in FIG. 5A, the taper opening end 24 of the display unit fitting section 23 in the cluster module 17 faces a tip of the display unit 4.

Figure 5B:
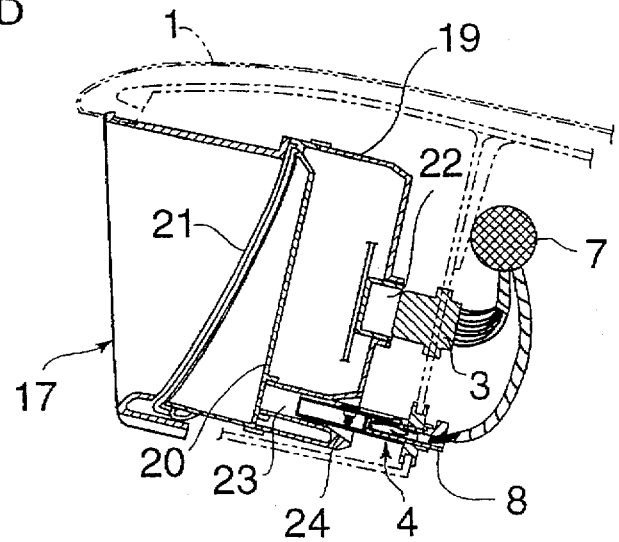
FIG. 5B is a vertical cross sectional view which shows a state in the installing process of the cluster module.

In this state, when the cluster module 17 is pushed slightly, as shown in FIG. 5B, the cluster module 17 goes into the concave section 2 as the display unit fitting section 23 is guided by the display unit 4. In such a manner, when the taper opening end 24 is brought into contact with the tip of the display unit 4, the cluster module 17 is led so as to be located accurately.

Figure 5C:
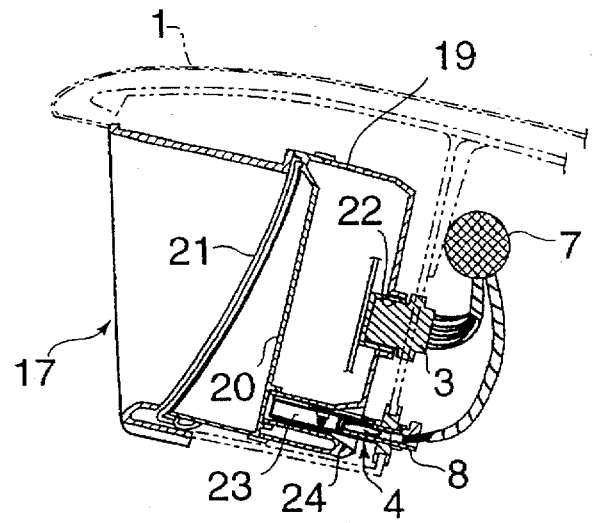
FIG. 5C is a vertical cross sectional view which shows a state after the installing process of the cluster module.

When the cluster module 17 is further pushed, as shown in FIG. 5C, the connector fitting section 22 is fitted into the W/H connector 3. As a result, the meter 19 is electrically connected to the instrument panel wire harness 7, and the display unit fitting section 23 is fitted to the display unit 4. In this state, the installation of the cluster module 17 to the instrument panel 1 is completed. The front surface of the display 9 reaches the lens 20 of the meter 19, and display contents are displayed on the display plate 21. Namely, at the same time of the installation of the cluster module 17, the display unit 4 is installed in the meter 19 of the cluster module 17, and the contents of the display 9 can be displayed on the display pate 21 of the meter without another electric wiring, etc.

As mentioned above, at the time of installing the cluster module 17, even if the first locating of the cluster module 17 is displaced slightly, the taper opening end 24 of the display unit fitting section 23 is led at the display unit 4, and finally the connector fitting section 22 is fitted into the W/H connector 3 accurately so that the installation of the cluster module 17 is completed. As mentioned above, since the complicated locating operation is not required, the cluster module 17 can be automatically installed.

In addition, since the display unit 4 is provided to the side of the instrument panel 1, the arrangement of the cluster module 17 an the circuit configuration of a flexible wiring substrate (not shown) which is installed to the rear surface of the meter 19 are simplified. Moreover, even if the cluster module 17 is replaced with another one of the meter 19, the display unit 4 remains on the side of the instrument panel 1. Therefore, even if the display 9 is an odometer, for example, it is not necessary to reset the counter, and it is not necessary to correct the counter.

In addition, since the display unit 4 is provided separately from the meter 19, if the arrangement of the display unit 4 is united, the display unit 4 can be used for a digital meter and an analog meter. Furthermore, since the display unit 4 has a movable structure that the connector 8 and the display 9 are provided separately, the display can be replace and repaired easily.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An installing structure for installing a cluster module arranged so that electric parts are put together in a concave section formed on a front surface of an instrument panel comprising:

a wire harness connector installed to a front wall surface of the concave section;

a display unit installed to the front wall surface of the concave section so as to be projected ahead than said wire harness connector;

a connector fitting section fitting to said wire harness connector, said connector fitting section being provided to a back surface of the cluster module; and a display unit fitting section fitted to said display unit, said display unit fitting section being provided to the back surface of the cluster module.

2. An installing structure of the cluster module as claimed in claim 1, wherein a taper opening end which is enlarged in an outer circumferential direction on said display unit fitting section.

3. An installing structure of the cluster module as claimed in claim 1 or 2, wherein:

said display unit is composed of a connector connected to an instrument panel wire harness and a display provided to the connector, said display unit fitting section is formed in a meter of the cluster module.

4. An installing structure of the cluster module as claimed in claim 3, wherein the display of said display unit is provided so as to be freely attached to and detached from the connector.

* * * * *